United States Patent [19]

Richards et al.

[11] 3,754,886

[45] Aug. 28, 1973

[54] METHOD FOR REFINING MOLTEN GLASS

[75] Inventors: Raymond S. Richards; Robert R. Rough; Douglas F. St. John, all of Toledo, Ohio

[73] Assignee: Owens-Illinois, Inc., Toledo, Ohio

[22] Filed: Apr. 2, 1971

[21] Appl. No.: 130,672

[52] U.S. Cl........................ 65/134, 65/178, 65/180, 55/36, 55/400
[51] Int. Cl............................................. C03b 5/18
[58] Field of Search...................... 65/134, 178, 180; 55/203, 159, 400, 36

[56] References Cited
UNITED STATES PATENTS

| | | | |
|---|---|---|---|
| 2,006,947 | 7/1935 | Ferguson | 65/134 |
| 2,007,755 | 7/1935 | Ferguson | 65/134 |
| 2,493,260 | 1/1950 | Paquette et al. | 65/134 |
| 2,871,000 | 1/1959 | Dowling | 65/180 |
| 2,138,468 | 11/1938 | Ayres | 233/18 |
| 2,587,206 | 2/1952 | Pattinson | 233/47 R |
| 2,222,727 | 11/1940 | Stigen | 233/22 |
| 2,113,963 | 4/1938 | Morton | 65/178 |

Primary Examiner—S. Leon Bashore
Assistant Examiner—Kenneth M. Schor
Attorney—E. F. Dwyer and E. J. Holler

[57] ABSTRACT

A method of removing undesirable gaseous inclusions, also known as seeds and bubbles, from seed containing or unrefined molten glass by continuously introducing this unrefined molten glass into a rapidly rotating contained glass mass, subjecting the unrefined molten glass mass to centrifugal forces substantially greater than gravity, and developing static pressure differences in the glass mass, resulting in pressure gradients in the molten glass and causing the gaseous inclusions to migrate to areas of lower static pressure and to the atmosphere from the molten glass, and subjecting the partially refined molten glass to increased centrifugal forces to remove additional gaseous inclusions, delivering refined molten glass from the contained glass mass, having reduced numbers of gaseous inclusions.

The refining apparatus is a container for holding molten glass mounted for rotation about its axis of rotation. A refractory-lined chamber within the container holds molten glass; the container has a centrally located top inlet, and a centrally located outlet at the bottom of the container. A slinger plate is positioned near the top inlet for diverting the entering molten glass stream within the container. A diverter plate is positioned within the container near the outlet of the container and causes the molten glass to flow adjacent the chamber wall on the way to the discharge, then subjecting the molten glass to an increased centrifugal force, and increasing the number of gaseous inclusions removed from the molten glass.

The container has a flange, encircling the outside thereof. Pair of rotatable driving wheels support the flange and provide means for rotating the container.

29 Claims, 6 Drawing Figures

United States Patent [19]
Richards et al.
[11] 3,754,886
[45] Aug. 28, 1973
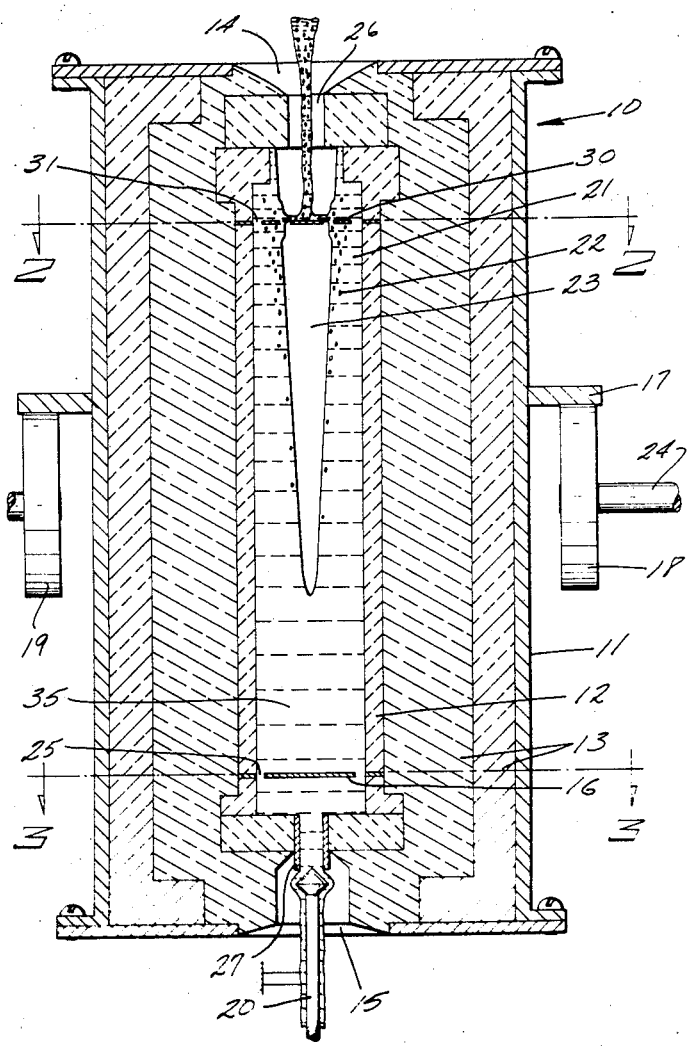

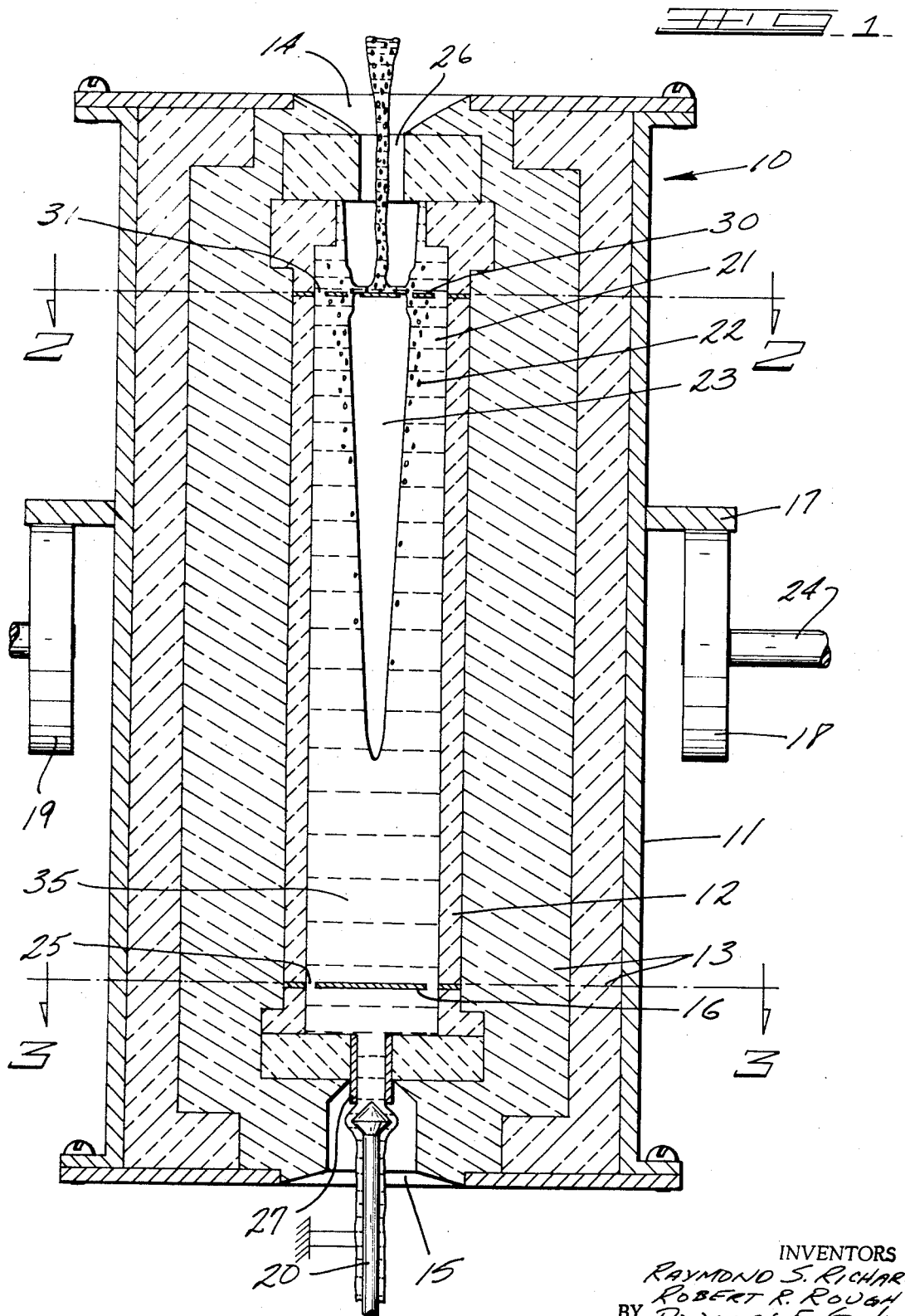

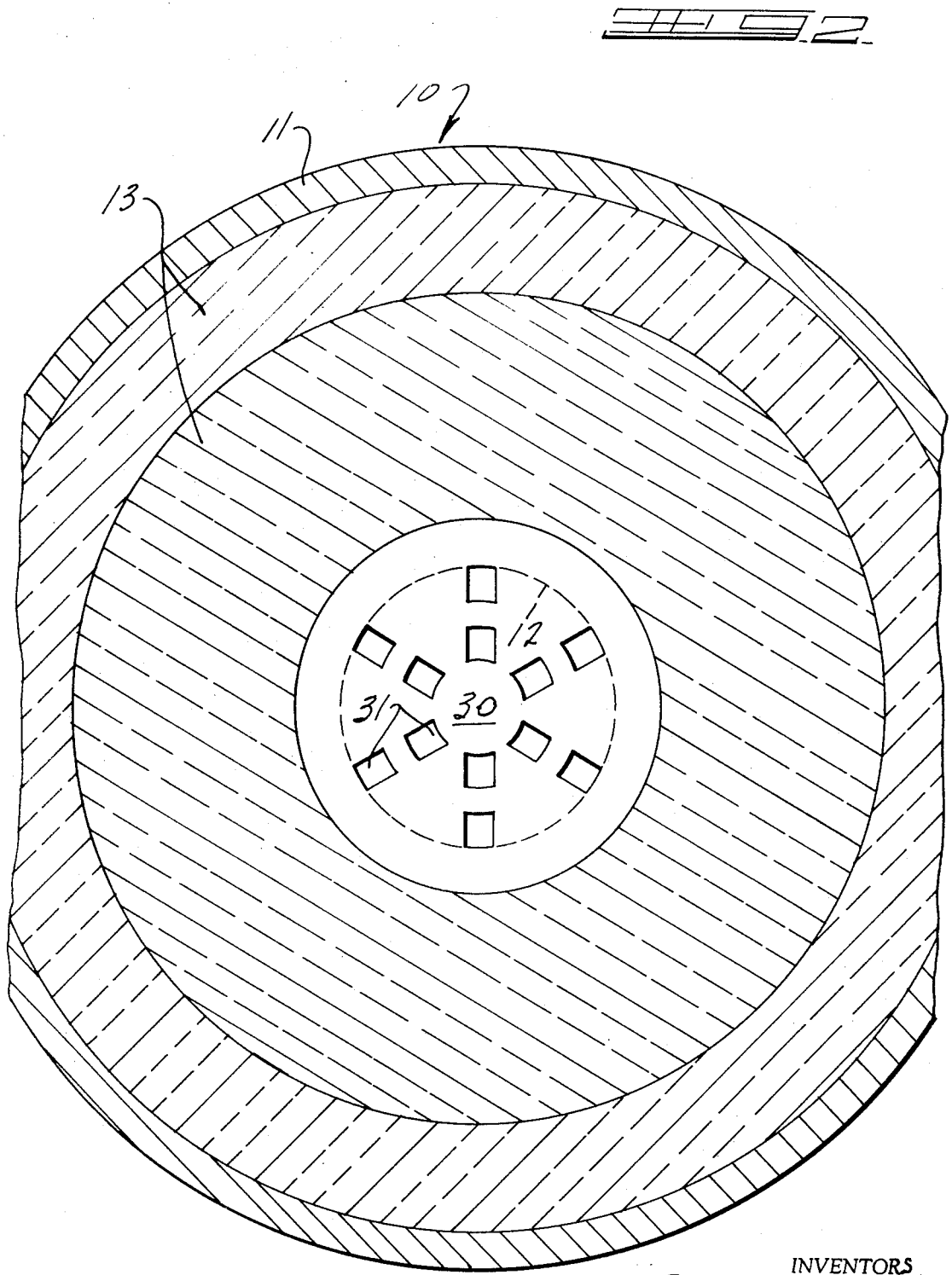

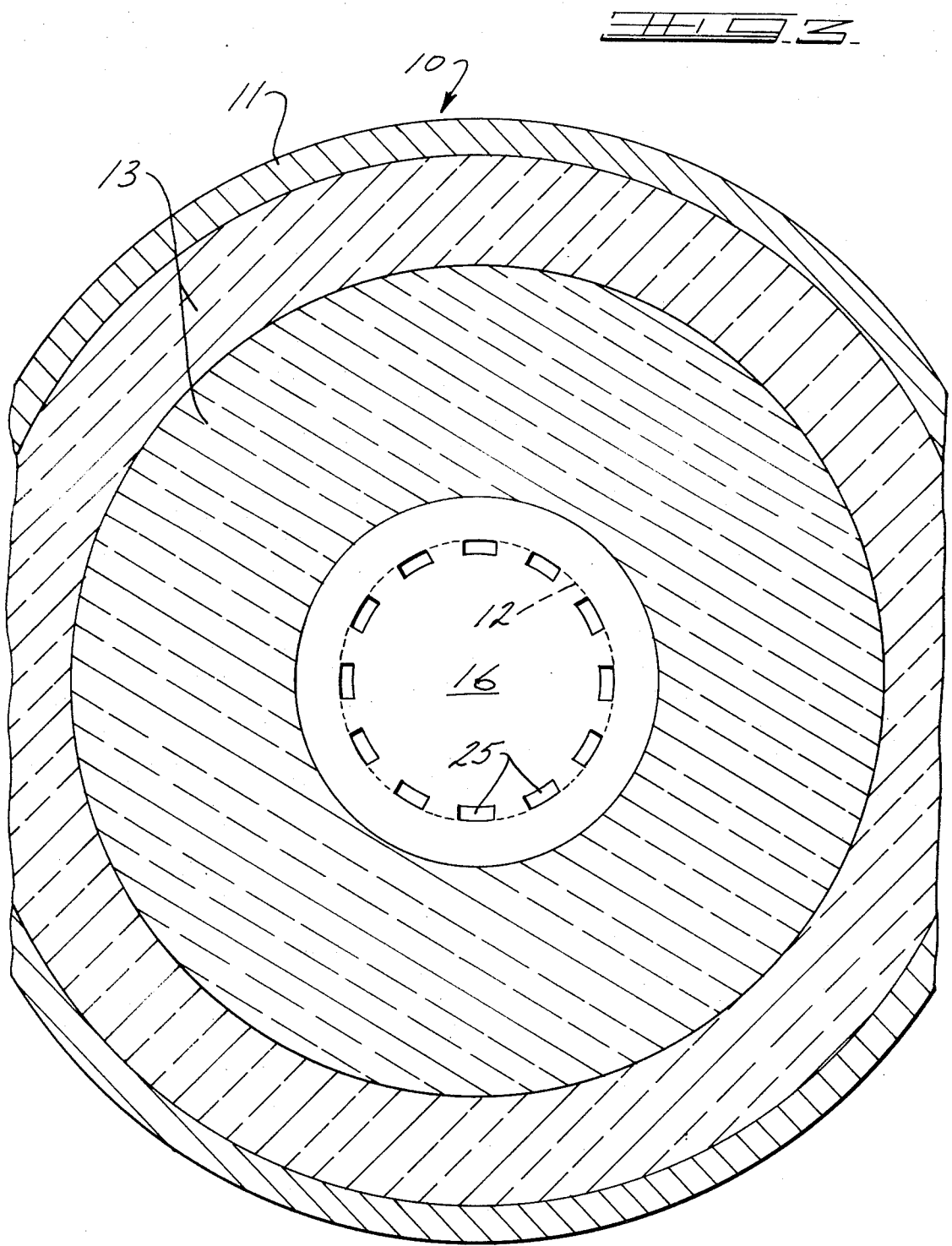

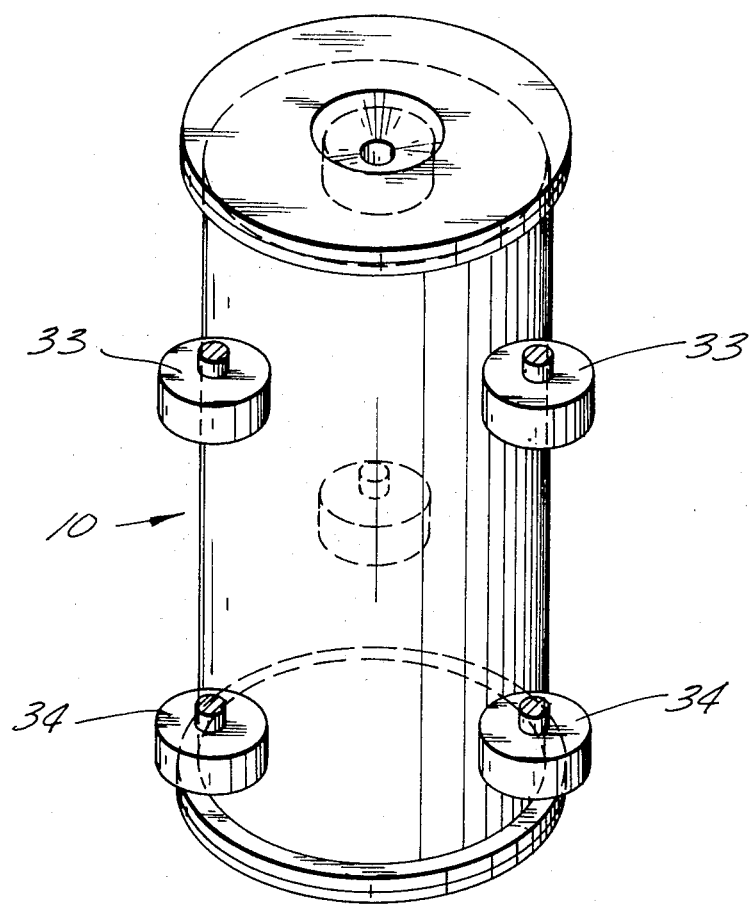

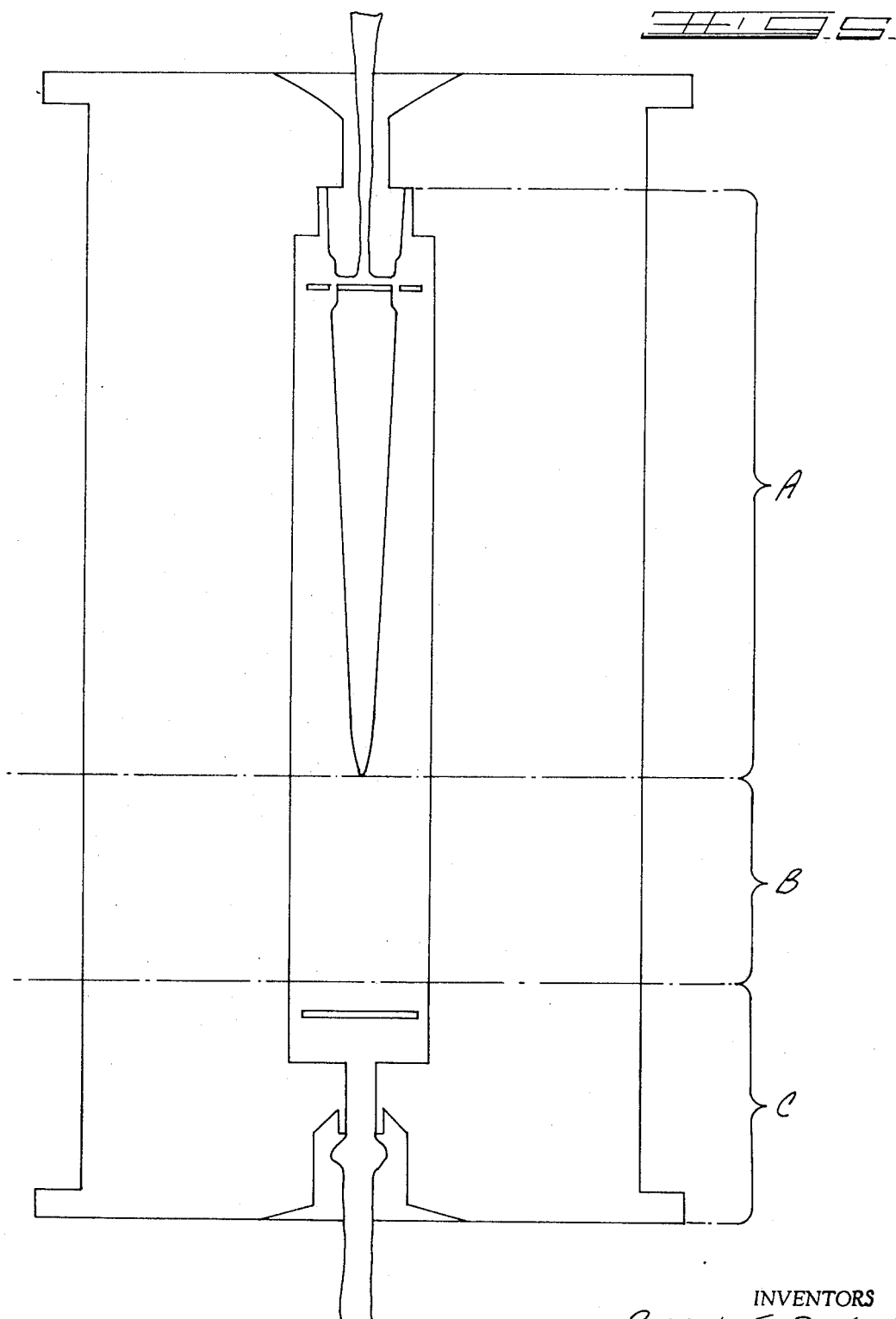

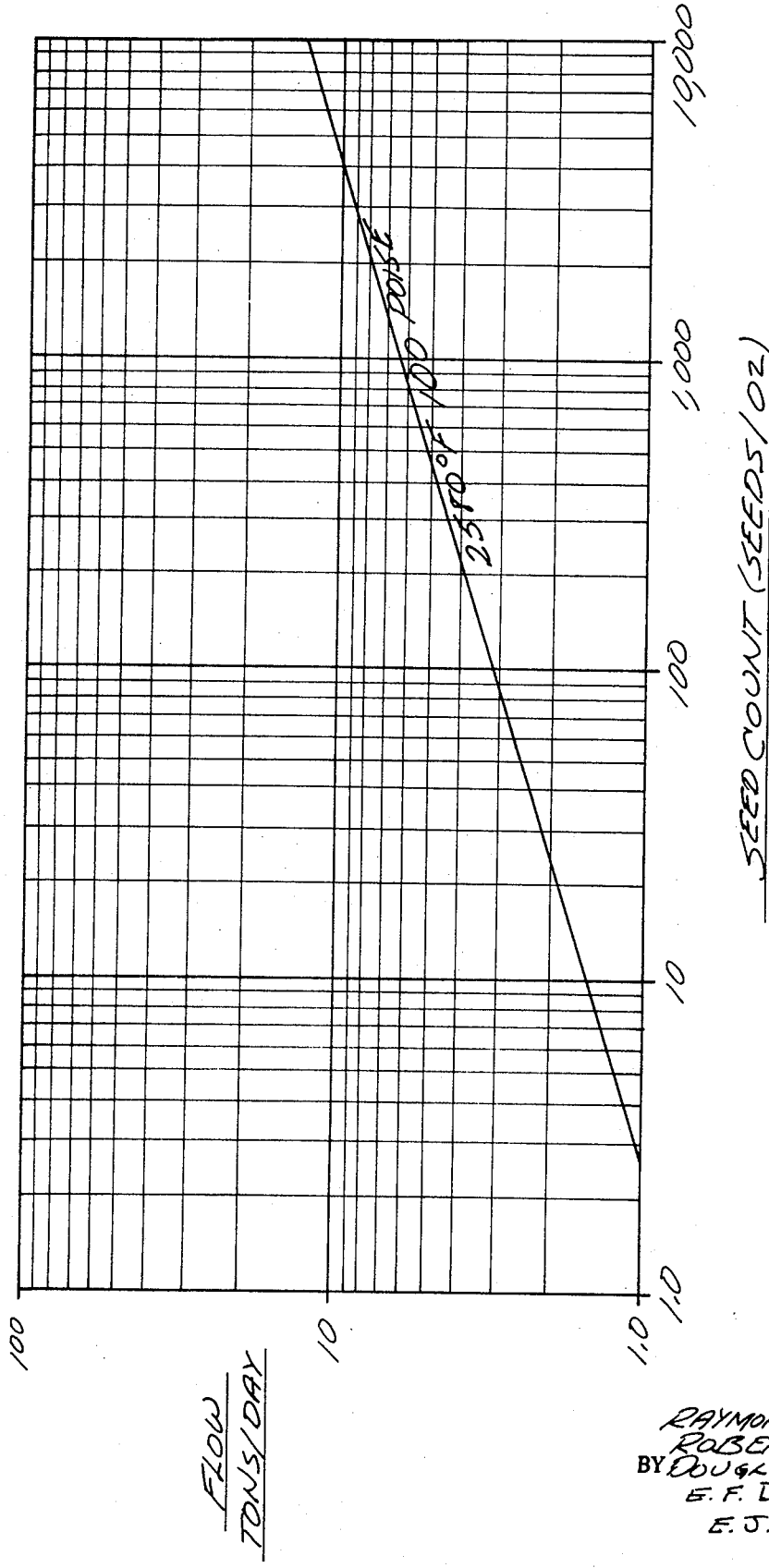

METHOD FOR REFINING MOLTEN GLASS

BACKGROUND OF THE INVENTION

Field of the Invention

This invention relates to a method and apparatus for refining molten glass to remove entrapped gaseous inclusions.

Gaseous Inclusion Sizing

Such gaseous inclusions are described in the art as seeds or blisters. The large seeds are designated blisters; however, there is no sharp line or demarcation between the classification of seeds and blisters. Seeds generally fall into the range of 0.001 inch to 0.030 inch diameter. This invention removes gaseous inclusions or seeds most effectively when the seeds are in the range of 0.001 inch to 0.030 inch and upwards in diameter.

DESCRIPTION OF THE PRIOR ART

One method of removing gaseous inclusions or refining glass in the prior art is to separately mix and then melt and heat the glass in the same or contiguous chambers to remove gaseous inclusions, resulting in essentially simultaneous melting and gaseous inclusion removal. Glass is made in this prior art way by melting glass-forming sand and stabilizing oxides at high temperatures in a refractory-lined tank to form molten glass. Sand and the other glass-forming constituent materials are accurately proportioned to yield glass of the desired composition, mixed, with or without adding heat, so that the material will be homogeneous, and the batch materials are heated to a sufficiently high temperature until the batch becomes a molten glass bath. Chemical reactions during the heating lead to the generation of bubbles or gaseous inclusions. These gaseous inclusions are then removed by continuing the heating of the molten glass in the tank. The heating time required for the elimination of the gaseous inclusions is further reduced, by the addition of fining agents, which facilitate the ultimate removal of gaseous inclusions during the continued heating of the molten glass.

Such prior art refining processes may also utilize physical agitation of the molten glass, bubbling gas through the molten glass or mechanically agitating the batch to decrease the time required for removing gaseous inclusions.

The refining process and apparatus of this invention can remove gaseous inclusions from unrefined molten glass in practically unlimited numbers.

Other prior art attempts to melt and refine glass are disclosed in U.S. Pat. No. 2,006,947 to J. Ferguson, issued July 2, 1935; and U.S. Pat. No. 2,007,755, to J. Ferguson, issued July 9, 1935.

The Ferguson U.S. Pat. No. 2,006,947 discloses an apparatus wherein batch materials are fed to a vertical furnace, rotating at a relatively slow speed; and heat is applied to the furnace to melt the batch material and form a thin layer of molten glass on the inner surface of the furnace. The rotation of the furnace produces centrifugal force on the thin layer of glass, which tends to remove seeds from the molten glass.

SUMMARY OF THE INVENTION

This invention relates to a method and apparatus for refining molten glass by supplying unrefined molten glass, i.e., having a high gaseous inclusion count, rotating a confined mass of such glass to produce an essentially paraboloidal void therein, caused by the rotation of the molten glass, and establishing areas of higher pressure and areas of lower pressure, which result in pressure gradients within the rotating glass mass and causing the gaseous inclusions to travel from areas of high static pressure to areas of lower static pressure and then from the molten glass to the void; and continually withdrawing the refined molten glass from the rotating glass mass. The process provides a refined molten glass with a lowered gaseous inclusion content. The refining operation of this invention eliminates the need for prolonged heating of large baths of molten glass, over long periods of time, to remove gaseous inclusions; can eliminate a need for the addition of fining agents, and reduces the residence time of the molten glass in the refining operation, thereby reducing costs and minimizing interface reactions, one of the sources of gaseous inclusions. The apparatus of the invention is a container having a refractory-lined chamber and which is mounted for rotation about its central vertical axis; a slinger plate is positioned within the chamber, near the glass entrance point. A diverter plate is positioned within the chamber, below the paraboloid void and nearer the discharge of the rotating container. The diverter plate diverts partially refined molten glass to areas of increased centrifugal force, near the chamber walls, redirecting a substantial portion of the remaining gaseous inclusions to the void, and further refines the molten glass.

BRIEF DESCRIPTION OF THE DRAWING

FIG. 1 is a side view, in partial cross-section, of the apparatus of this invention;

FIG. 2 is a sectional view from the top of the slinger plate; along line 2—2 of FIG. 1;

FIG. 3 is a sectional view from the top of the diverter plate; along line 3—3 of FIG. 1;

FIG. 4 is a perspective view of the refining apparatus showing the stabilizing wheels;

FIG. 5 is a schematic representation of the apparatus showing multiple processing zones;

FIG. 6 is a graph showing the relationship between a process variable condition such as glass output in tons-per-day, versus seed-count-per-ounce of the refined glass using the apparatus of Example I.

GENERAL DESCRIPTION OF THE INVENTION

In the practice of this invention, previously mixed and melted materials, produce unrefined molten glass having a high density of gaseous inclusions; this unrefined glass is subsequently introduced into the upper end of a continuously rotating chamber of the refining apparatus. The chamber contains a sufficiently large mass of glass to produce a paraboloidal void in the glass, when rotated. Continuous rotation of the chamber about its axis subjects portions of the mass of glass in the chamber to centrifugal force and, thereby, causes generally radially extending pressure gradients within the molten glass, which causes the gaseous inclusions to migrate to the paraboloidal cavity. The refined molten glass is continuously removed from the lower end of the chamber at a rate substantially corresponding to the rate at which the unrefined molten glass is introduced into the chamber.

In one preferred form of the invention, the entering stream of unrefined molten glass is directed radially outward toward the sides of the chamber. In addition, portions of the molten glass from below the paraboloidal void, are redirected radially outwardly toward the periphery of the chamber to move these portions to an area of greater centrifugal force, to further facilitate the removal of the gaseous inclusions before the refined molten glass is removed from the lower end of the chamber, as will be described in detail hereinafter.

APPARATUS

Referring to FIG. 1, the apparatus for removing gaseous inclusions 22 from molten glass mass 21 comprises a container 10 which includes a cylinder 11, layers 12 of refractory material and insulating materials 13 positioned within the cylinder and forming a chamber 35 for holding molten glass and reducing heat losses. The container is mounted for rotation about its vertical axis. The axis of rotation may be tilted away from the vertical over a range toward the horizontal, but the axis of rotation is preferably more vertical than horizontal.

The container has an inlet section 14 and a discharge section 15. The inlet is centered in the top of the container. The discharge section 15 is centered in the bottom of the container.

The inlet 14 has narrow inlet opening portion 26, which is smaller in diameter than the chamber 35.

A slinger plate 30 is positioned in proximity to the inlet 14 and diverts unrefined molten glass from an entering axial path radially toward the inner surface of the refractory chamber 35. The slinger plate 30 is anchored in the refractory lining (FIG. 1).

The slinger plate 30, as shown in a top view (FIG. 2), has two rows of circumferentially-spaced, substantially identical slots 31, through which the unrefined molten glass passes into the chamber, and gaseous material passes out from the chamber and out of the container.

The total cross-sectional area of the slots 31 of the slinger plate 30 is such that there is relative unimpeded flow of the unrefined molten glass through the slinger plate 30. The slinger plate 30 diverts the axial flow of unrefined molten glass and causes the flow to change direction in the chamber to a generally radially outward direction, from the axial.

A diverter plate 16 (FIG. 1) is positioned generally horizontal near the discharge section 15 of the container. The diverter plate 16 in this embodiment is anchored in the refractory liner 12. FIG. 3 shows a top view of the diverter plate 16. The plate 16 is provided with a plurality of passages, which can be uniformly spaced; substantially identical slots 25, adjacent to the outer periphery of the plate, adjacent the chamber walls, which provide a passage for the molten glass to the discharge tube 27 of the chamber.

The diverter plate 16 directs the molten glass toward the periphery of the inner wall of the chamber 35, into areas of increased centrifugal force, compared with the centrifugal force radially inward from the wall. The increased centrifugal force tends to increase the number of gaseous inclusions directed to the paraboloidal void 23, formed in the glass, due to rotation, and removes additional numbers of gaseous inclusions from the molten glass in the chamber.

Discharge tube 27 is provided in the chamber bottom, and it is smaller in diameter than the bottom diameter of chamber 35. One end of discharge tube 27 extends beyond the lower surface of the chamber bottom into the discharge section 15 of the container.

A glass-collecting rod 20 is positioned by any suitable means adjacent the discharge conduit 27, to collect the exiting molten glass.

A flange 17, for supporting the container, encircles the outer periphery of the cylinder 11 the glass-collecting rod provides a discharge path from the chamber to any glass-collecting means. Rotatable drive wheels 18 and 19 engage the under-surface of the flange and support the container. One of the wheels is driven by a drive shaft 24, from a conventional motive power, such as an electric motor (not shown), the driven wheel 18 engaging a surface of the flange 17, rotates the container. FIG. 4 illustrates the stabilizing wheels used for maintaining the rotating container generally in its axis of rotation.

Rotatable wheels 33 and 34 are positioned about the outer surface of the container, near the top and bottom thereof, to stabilize the container while rotating (FIG. 4).

Chamber 35 has the outer configuration of an elongated cylinder, the chamber 35 having a radius which is substantially constant from the top to the bottom thereof, especially in the portions which form the molten glass holding chamber.

The outer configuration of the molten glass mass 21 is controlled by the shape of the container. In the cylindrical form of FIG. 1, the mass of glass is controlled to subject the mass of glass to the same centrifugal force, along any line equi-distant and parallel to the central vertical axis.

In embodiments wherein the container holds the molten glass, without a refractory chamber, the same configuration as described for the chamber, may be used, and the above description is equally applicable to the container.

Other configurations may be used, such as one wherein the radius of a lower portion of the chamber is greater than the radius of an adjacent upper portion of the chamber.

METHOD

Removing entrapped gaseous inclusions, known also in the art as seeds and bubbles, is performed by introducing unrefined molten glass into a rapidly rotating container, providing a contained rotating glass mass therein, forming in the molten glass a substantially paraboloidal void communicating with the atmosphere. The rotation of the glass mass subjects the unrefined molten glass to centrifugal forces substantially greater than gravity and develops static pressure differences throughout the glass mass, resulting in pressure gradients in the molten glass. There, pressure gradients provide a moving force causing the gaseous inclusions to travel from areas of higher static pressure to areas of lower static pressure, sending a large number of the gaseous inclusions into the void, and delivering molten glass from the contained rotating glass mass, having both reduced numbers of gaseous inclusions and smaller sized gaseous inclusions.

Pressure gradients cause gaseous inclusions to move generally along the pressure gradients from points of higher pressure to points of lower static pressure, but the direction of travel of any gaseous inclusion is a vector resultant of forces acting on the gaseous inclusions; however, those gaseous inclusions which do not enter the void remain in the molten glass and flow to an area of molten glass which is beneath the apex of the void.

The diverter plate 16 positioned beneath the apex of the void directs the molten glass into an area of increased centrifugal force as it flows to the discharge. The increased centrifugal force redirects some of the gaseous inclusions remaining in the glass toward and into the void, removing most gaseous inclusions in the size range of 0.001 inch to 0.010 inch and upwards from the molten glass, and further refining the glass. Gaseous inclusions in the size range smaller than about 0.001 inch do not go into void, but pass out of the refiner in the refined molten glass; smaller sizes can be removed with a change in operation of the apparatus; or process parameters.

FIG. 5 shows multiple zones of processing in the rotating glass mass designated as zones A, B and C. The "A" zone is a zone of rotating molten glass developing therein a paraboloidal void. The "C" zone includes the area above the diverter plate and the area of molten glass influenced by the diverter; the "B" zone is the area of molten glass lying between the upper boundary of influence of the diverter on the flow of the molten glass, and below the tip of the void. A detailed description of the processing zones follows hereinbelow.

In one practice of this invention, glass-making materials are placed into a melting apparatus (not shown), and mixed to homogenize the batch material, and the mixture of batch materials is raised to above the melting point of the batch material to produce molten unrefined glass having great numbers of undesirable gaseous inclusions. The unrefined molten glass is then transferred from the melting apparatus to the container 10 either as a continuous or an intermittent stream. The container rotates and the molten glass mass is thus rotated and develops a void, as shown in zone A (FIG. 5).

The rotating void has a surface with portions which are steeply inclined to the vertical. The angle of this surface inclination is determined by the speed of rotation and the distance of that point on the surface from the apex of the paraboloidal void, wherein the inclination angle is measured. The distance from the apex of the void, to the bottom of the container, is determined by the volume of the glass within the rotating container, at any selected R.P.M.

The glass mass surrounding the void has an increasing thickness downward, as measured along any axially extending line. Centrifugal forces in the glass at the chamber wall and centrifugal forces on the innermost portion of glass at the void, differ, and the difference increases as the glass mass progresses, from the upper end of the chamber toward the bottom of the void, measured along any radially extending line, from the axis to the wall.

The path of travel of any gaseous inclusion is a vector resultant of the forces acting on it. Forces which act upon gaseous inclusions in the "A" zone includes centrifugal force produced by the rotation of the glass mass, the force resulting from the velocity of the downward flow of the viscous molten glass through the container, and a buoyant force of the gaseous inclusion in the molten glass.

When the centrifugal forces are sufficiently greater than other forces acting on the gaseous inclusion, to cause a favorable vector resultant force, the path of travel for most gaseous inclusions is generally toward the void, unless the combination of downward glass velocity distance to the void, and time, does not permit travel to the void.

The vector resultant force on the gaseous inclusion in zone "A" is influenced by the size of the gaseous inclusion, the viscosity of the molten glass, the density of the molten glass, gravitational force, centrifugal force, and the velocity of the downward flow of the molten glass in the apparatus. These forces interact to produce a vector resultant force that determines whether a particular bubble is removed from the glass via the void or remains in the glass and goes into zone "B" area below the apex of the void; these gaseous inclusions are designated "bypass inclusions".

This invention provides means and method to "recapture" and redirect these "bypass" inclusions by restructuring the vector resultant force acting upon some of the bubbles in zone "C" and send a percentage of the "bypass" bubbles, to the void, through zone "B." The means is a diverter plate 16 positioned in zone "C," between the apex of the void and the discharge 27. The diverter causes all of the molten glass in zone "B" to pass through an area of greater centrifugal force at the periphery of zone "C." This increased centrifugal force changes the vector resultant force on some of the bubbles and, in some cases, causes gaseous inclusions to travel back into zone B and toward the paraboloidal void. The "recapture" action of the diverter results in the removal of more gaseous inclusions from the molten glass than would be removed by the process operating without the diverter plate 16.

Those gaseous inclusions not removed by this diversion activity pass through with the molten glass into the discharge of the apparatus.

This invention removes gaseous inclusions rapidly compared with the prior art glass bath thermal refining of up to 36 hours or more; the number of gaseous inclusions is reduced to about 500 – 600 seeds-per-ounce, within an hour, and usually within an average residence time of about 15 minutes or less for any retained mass of glass. The number and sizes of gaseous inclusions remaining, decreases with an increase in residence time of a retained mass of glass.

EXAMPLE I

In preparing example I, unrefined glass batch was prepared using a sand, soda ash, limestone, feldspar mix and melted in a rotary furnace to a temperature of above 2,600°F., and the unrefined glass had a gaseous inclusion or seed count of about 20,000 to 40,000 seeds per ounce; the unrefined molten glass was delivered to a rotating container 10 at about 2,600°F. The container 10 in example I had an overall height of approximately 48 inches, outside diameter of approximately 24 inches, and a chamber diameter of 6 inches. The container was rotated at a speed of approximately 970 revolutions-per-minute. At this speed, a paraboloid developed with a diameter of approximately 2.5 inches at a void height of about 20 inches, with a molten glass depth of approximately 15 inches from the tip of the void 23 to the chamber bottom.

The rotation of the container at about 970 RPM produces a centrifugal force near the internal surface of the chamber of about 80 times the force of gravity.

The surface of the paraboloidal void has portions which are steeply inclined to the horizontal. The inclination angle of this surface is determined by the speed of rotation and the distance of the surface point being measured from the apex of the paraboloidal void; for example, at about 970 RPM, a line drawn tangent to the point 12 inches up from the apex of paraboloidal void, and intersecting a horizontal plane, has an inclination from the horizontal line of 87.8°.

The apparatus refined molten glass at the rate of about 5.0 tons per 24-hour day and produced glass having about 500 seeds-per-ounce using the method of counting seeds described herein below.

The method of determining seeds-per-unit volume is based upon a visual count of seeds-per-ounce of glass when the glass is obliquely lit and immersed under a liquid with a similar refractional index, such as monochloro-benzene.

The size of seeds can be determined with the use of a reticle or gradient in conjunction with a magnifying lens or by automatic differential area determination techniques known to those skilled in the art.

FIG. 6 is a graph of the data of Example I, showing the relationship between flow (output) in tons-per-24-hour day, and approximate seed count in seeds-per-ounce of glass refined.

The molten glass was maintained at about its entering temperature throughout the process, and the exiting stream of refined glass was near the temperature of the entering stream.

Table I, in addition to Example I, shows four other examples of seed removal using this invention.

TABLE I

| | Glass temp., °F. | | Speed, r.p.m. | Parabola | | Through-put, tons/day | Approx. count, seeds/oz. |
|---|---|---|---|---|---|---|---|
| | In | Out | | Dia. | Hgt. | | |
| I | 2,600 | 2,600 | 970 | 2½" | 20" | 5 | About 500. |
| II | 2,275 | 2,120 | 900 | 2½" | 18" | 2 | 6,500–7,000. |
| III | 2,600 | 2,600 | 900 | 2⅞" | 24" | 4 | 1,000–1,500. |
| IV | 2,625 | 2,600 | 1,000 | 2⅜" | 20" | 8 | 1,750–3,500. |
| V | 2,600 | 2,500 | 900 | 2½" | 18" | 4 | 500–600. |

The entering and exiting temperatures were measured using an optical pyrometer.

The parabola diameter was measured at its greatest axial diameter, at the heights indicated, measured along the axis of rotation from the tip of the void.

The result of all factors, RPM, viscosity, and throughput, on the percentage of gaseous inclusions removed in any size range, is designated the "Refining Factor." The "Refining Factor" can be increased in the operation of the apparatus of Example 1 by increasing the number of RPM, temperature, residence time of the retained mass, either singly or in combination, or changing the parameters of the apparatus.

This ability to effect meaningful changes in the "Refining Factor" provides a refining process with a high degree of flexibility in choosing operating conditions to determine the ultimate seed count of the refined glass.

The maximum "Refining Factor" for any set of selected operating conditions, i.e., Example 1, is achieved when the paraboloidal void is approximate in length to the depth of the molten glass beneath the tip of the void to the bottom of the chamber.

This invention also provides a method and apparatus for refining unrefined molten glass wherein the undesirable gaseous inclusions are moved rapidly from a rotating mass of molten glass to a void produced in the glass mass by centrifugal force induced by the rotation of the mass, and in the absence of fining agents, if desired, and wherein the refining is accomplished without the addition of heat to the glass during the refining operation.

OTHER EMBODIMENTS

The apparatus (FIG. 1) of this invention can be operated without the diverter 16; the "Refining Factor" is greatly reduced; this reduction in refining factor reduces the number of gaseous inclusions removed using, for example, the operating conditions equivalent to Example 1.

We claim:

1. The method of refining molten glass which comprises:
    defining a chamber having an axis of rotation and which has a restricted lower end forming an outlet;
    introducing molten glass wherein substantially all the glass constituents are molten and which contains entrapped gaseous inclusions into the chamber providing a mass of molten glass in the chamber;
    rotating said chamber about its axis to subject portions of the mass of glass in the chamber to centrifugal force;
    controlling the configuration of the chamber, the speed of rotation of the chamber, and the amount of glass in the chamber, such that at least a portion of the mass of glass in the chamber forms a substantially cylindrical portion with a paraboloidal void, said substantially cylindrical portion of glass extending from the top of the mass of glass in the chamber to the apex of the paraboloidal void having a radial thickness which increases progressively from the top to the apex of the paraboloidal void;
    adding unrefined molten glass to the chamber to maintain the mass of glass in the chamber substantially constant; and
    substantially continuously removing refined molten glass from the lower end of the chamber to maintain said mass of glass in said chamber substantially constant.

2. The method set forth in claim 1 wherein the step of controlling the configuration of the chamber, the speed of rotation of the chamber, and the amount of glass in the chamber is such that the mass of glass in the chamber increases in radial width from the top of the mass of the glass to the apex of the paraboloidal void.

3. The method set forth in claim 1 wherein the step of controlling the configuration of the chamber, the speed of rotation of the chamber, and the amount of glass in the chamber is such that the average axial velocity of the glass does not increase from the top of the mass of glass to the apex of the paraboloidal void.

4. The method set forth in claim 1, including the step of controlling the amount of molten glass in the chamber such that there is a substantial mass of glass between the apex of the paraboloidal void and the outlet of the chamber.

5. The method set forth in claim 4, including the step of redirecting the molten glass beneath the apex of the paraboloidal void, so that the molten glass in the area between the void and the outlet is caused to move radially outward toward the wall of the chamber in advance of the outlet.

6. The method set forth in claim 4, including the step of redirecting the molten glass beneath the apex of the paraboloidal void such that it is caused to move through a path adjacent the wall of the chamber before moving to the outlet.

7. The method set forth in claim 4, including the step of causing the molten glass between the apex of the paraboloidal void and the outlet to move radially outward from its axis of rotation and then generally radially inward to move portions of the molten glass through an area of centrifugal pressure greater than the pressure in the area at the axis of its rotation.

8. The method set forth in claim 1, including the step of controlling the speed of rotation of the chamber such that the height of the paraboloidal void formed in the molten glass is at least several times the maximum diameter of the paraboloidal void.

9. The method set forth in claim 1, wherein the step of controlling the amount of molten glass in the chamber is such that the radial thickness of the glass at the upper end of the chamber exceeds the radius of the paraboloidal void in the glass at the upper end of the chamber.

10. The method set forth in claim 1, wherein the step of introducing the molten glass into the chamber comprises directing the glass laterally such that molten glass merges with the mass of glass in the chamber adjacent the upper end of the chamber.

11. The method set forth in claim 1, wherein the step of controlling the amount of molten glass in the chamber is such that the height of the paraboloidal void is about equal to the depth of the glass beneath the apex of the paraboloidal void.

12. The method set forth in claim 1, including the step of controlling the configuration of the chamber such that it has a substantially constant diameter from the upper end to the lower end thereof.

13. The method set forth in claim 1, including the step of causing the molten glass between the apex of the paraboloidal void and the outlet to move radially outward from its axis of rotation and then generally radially inward to move portions of the molten glass through an area of centrifugal pressure greater than the pressure in the area at the axis of its rotation.

14. The method of refining molten glass which comprises:
defining a substantially cylindrical chamber having an axis of rotation and which has an upper end and a restricted lower end forming an outlet;
introducing molten glass wherein substantially all the glass constituents are molten and which contains entrapped gaseous inclusions into the open upper end of the chamber providing a mass of molten glass in the chamber;
rotating said chamber about its axis to subject portions of the mass of glass in the chamber to centrifugal force;
controlling the configuration of the chamber, the speed of rotation of the chamber, and the amount of glass in the chamber such that the mass of glass in the chamber forms a paraboloidal void having a top and an apex, and the glass mass has a radial thickness which increases progressively from the top to the apex of the void;
adding unrefined molten glass to the upper end of the chamber to maintain the mass of glass in the chamber substantially constant; and
substantially continuously removing refined molten glass from the lower end of the chamber to maintain the mass of said glass substantially constant.

15. The method set forth in claim 14 wherein the step of controlling the configuration of the chamber, the speed of rotation of the chamber, and the amount of glass in the chamber is such that the average axial velocity of the glass does not increase from the top of the mass of glass to the apex of the paraboloidal void.

16. The method set forth in claim 14, including the step of controlling the amount of molten glass in the chamber such that there is a substantial mass of glass between the apex of the paraboloidal void and the outlet of the chamber.

17. The method set forth in claim 16, including the step of redirecting the molten glass beneath the apex of the paraboloidal void so that the molten glass in the area between the void and the outlet is caused to move radially outward toward the wall of the chamber in advance of the outlet.

18. The method set forth in claim 16, including the step of redirecting the molten glass beneath the apex of the paraboloidal void such that it is caused to move through a path adjacent the wall of the chamber before moving to the outlet.

19. The method set forth in claim 16, including the step of causing the molten glass between the apex of the paraboloid void and the outlet to move radially outward from its axis of rotation and then generally radially inward to move portions of the molten glass through an area of centrifugal pressure greater than the pressure in the area at the axis of its rotation.

20. The method set forth in claim 14, including the step of controlling the speed of rotation of the chamber such that the height of the paraboloidal void formed in the molten glass is at least several times the maximum diameter of the paraboloidal void.

21. The method set forth in claim 14, wherein the step of controlling the amount of molten glass in the chamber is such that the radial thickness of the glass at the upper end of the chamber exceeds the radius of the paraboloidal void in the glass at the upper end of the chamber.

22. The method set forth in claim 14, wherein the step of introducing molten glass comprises directing the glass into the open upper end of the chamber laterally such that molten glass merges with the mass of glass in the chamber adjacent the upper end of the chamber.

23. The method set forth in claim 14, wherein the step of controlling the amount of molten glass in the chamber is such that the height of the paraboloidal void is about equal to the depth of glass beneath the apex of the paraboloidal void.

24. The method set forth in claim 14, including the step of controlling the configuration of the chamber such that it has a substantially constant diameter from the upper end to the lower end thereof.

25. The method set forth in claim 14, including the step of causing the molten glass between the apex of the paraboloidal void and the outlet to move radially outward from its axis of rotation and then generally radially inward to move portions of the molten glass through an area of centrifugal pressure greater than the pressure in the area at the axis of its rotation.

26. The method of refining molten glass which comprises:

defining a chamber having an axis of rotation;
rotating said chamber about said axis;
introducing molten glass, wherein substantially all the glass constituents are molten and which contains entrapped gaseous inclusions into the chamber providing a mass of molten glass in the chamber;
continuing the rotating of said chamber about its axis to subject portions of the mass of glass in the chamber to centrifugal force, and thereby cause the mass of glass to form a portion of a paraboloidal void under the action of the centrifugal force; and
controlling the configuration of the chamber, the speed of rotation of the chamber, and the amount of glass in the chamber such that at least a portion of the mass of glass in the chamber forms a substantially cylindrical portion with a paraboloidal void, said substantially cylindrical portion of glass extending from the top of the mass of glass in the chamber to the apex of the paraboloidal void, and having a radial thickness which increases progressively from the top to the apex of said void.

27. The method set forth in claim 26, wherein the step of controlling the amount of molten glass in the chamber is such that the radial thickness of the glass at the upper end of the chamber exceeds the radius of the paraboloidal void in the glass at the upper end of the chamber.

28. The method set forth in claim 26, including the step of controlling the configuration of the chamber, such that it has a substantially constant diameter from the upper end to the lower end thereof.

29. The method of refining molten glass which comprises:
defining a chamber having an axis of rotation and which has a restricted upper end and a restricted lower end forming an outlet;
introducing molten glass wherein substantially all the glass constituents are molten and which contains entrapped gaseous inclusions into the open upper end of the chamber providing a mass of molten glass in the chamber;
rotating said chamber about its axis to subject portions of the mass of glass in the chamber to centrifugal force;
controlling the configuration of the chamber, the speed of rotation of the chamber, and the amount of glass in the chamber such that a paraboloidal void is formed in the mass of glass;
adding unrefined molten glass to the upper end of the chamber to maintain the mass of glass in the chamber substantially constant; and
substantially continuously removing molten glass from the lower end of the chamber; and
causing the molten glass between the apex of the paraboloidal void and the outlet to move radially outward from its axis of rotation and then generally radially inward to move portions of the molten glass into the area of centrifugal pressure greater than the pressure in the area at the axis of its rotation.

* * * * *